United States Patent [19]

Yasuhara et al.

[11] Patent Number: 4,638,782
[45] Date of Patent: Jan. 27, 1987

[54] APPARATUS FOR CONTROLLING FUEL INJECTION TIMING IN A FUEL INJECTION PUMP

[75] Inventors: Seishi Yasuhara, Yokohama; Mitsuo Hagiwara, Higashimatsuyama; Kazuo Inoue, Higashimatsuyama; Kyoichi Fujimori, Higashimatsuyama; Akira Sekiguchi, Higashimatsuyama; Hiroshi Okada, Isezaki, all of Japan

[73] Assignee: Diesel Kiki Co., Ltd., Japan

[21] Appl. No.: 569,673

[22] Filed: Jan. 10, 1984

[30] Foreign Application Priority Data

Jan. 11, 1983 [JP] Japan .................................. 58-2592

[51] Int. Cl.$^4$ ............................................ F02M 39/00
[52] U.S. Cl. .................................. 123/502; 123/479; 123/357
[58] Field of Search ............... 123/502, 501, 500, 479, 123/357, 358, 359

[56] References Cited

U.S. PATENT DOCUMENTS

| 4,355,621 | 10/1982 | Yasuhara | 123/500 |
| 4,395,905 | 8/1983 | Fujimori | 123/502 |
| 4,476,837 | 10/1984 | Salzgeber | 123/502 |
| 4,492,196 | 1/1985 | Oshizawa | 123/479 |

Primary Examiner—Carl Stuart Miller
Attorney, Agent, or Firm—Guy W. Shoup

[57] ABSTRACT

In an control apparatus for controlling a timing of injection of fuel to be injected into an internal combustion engine, the apparatus comprises a closed loop system in which the data showing the actual timing of injection of of fuel is fed back. When the condition of the operation of the engine becomes a predetermined state, the control system is changed from the closed loop system to another system in which an adjusting member for adjusting the timing of injection of fuel is controlled by a signal which is not related to the actual timing of injection. As a result, the stability of the operation in low engine speed zone is remarkably improved.

12 Claims, 5 Drawing Figures

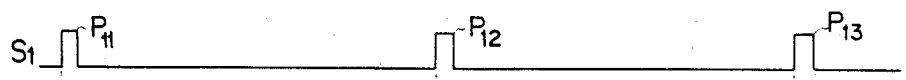
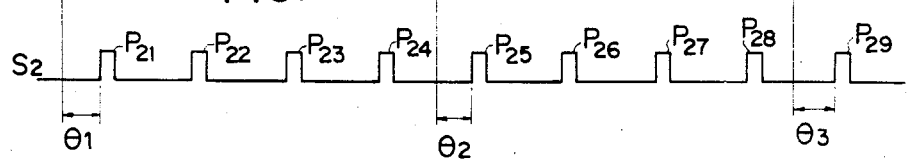
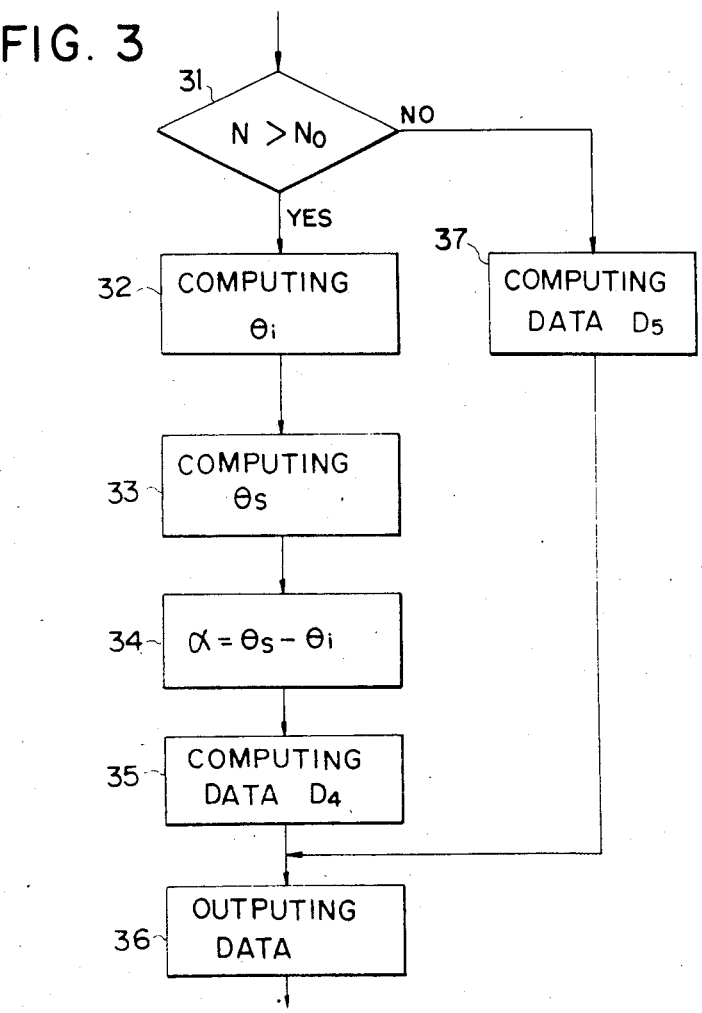

APPARATUS FOR CONTROLLING FUEL INJECTION TIMING IN A FUEL INJECTION PUMP

BACKGROUND OF THE INVENTION

The present invention relates to an apparatus for controlling the injection timing of the fuel to be injected into an internal combustion engine.

For the purpose of electronically controlling the timing of the fuel supply to an internal combustion engine in response to the operating conditions of the engine, various types of apparatuses for controlling the timing of fuel injection have been proposed (c.f. SAE 800167). In general, this type of apparatus has a sensor for detecting the timing of a predetermined reference angle position (e.g. top dead center timing) of the crankshaft of the engine and another sensor for detecting the actual timing of fuel injection by a fuel injection pump and it is so arranged that the position of an injection timing adjusting member of the fuel injection pump is controlled in such a way that the actual timing of injection as determined from the outputs from the above-mentioned sensors is coincident with the optimum injection timing at each instant computed on the basis of operation parameters, such as the rotational speed of the engine. The use of a closed loop system as mentioned above can be expected to realize highly accurate control of the timing of fuel injection. However, in the low rotational speed zone of the engine, it brings about a disadvantage which impairs the stable control condition. The reasons for this will be explained below.

In the low rotational speed zone where the amount of injection is rather small, the control conditions become unstable because the signal waveform required for determining the actual injection timing cannot be obtained owing to the low level of the output signal from the sensor for detecting the actual fuel injection timing (for example, a needle valve lift sensor provided in the fuel injection valve). Moreover, excessive amplification of the sensor signal would decrease S/N ratio of the signal and lead to erroneous operation. Further, a large error occurs in the computation of the actual fuel injection timing because of the great changes that occur in the rotational speed within each combustion cycle.

Another disadvantage is that, in driving the injection timing adjusting member by the use of a hydraulic timer or the like, since the oil pressure at low rotational speed is not sufficiently high for the control of the adjusting member, the desired effect cannot be attained even if the closed loop system is employed.

SUMMARY OF THE INVENTION

An object of the present invention is, therefore, to provide an improved apparatus for controlling the timing of fuel injection.

Another object of the present invention is to provide an electronically controlled type apparatus for controlling the timing of fuel injection, which can accurately control the timing of fuel injection even in the low rotational speed zone of the engine.

A further object of the present invention is to provide an electronically controlled type of apparatus for controlling the timing of injection of fuel, in which the timing of injection of fuel is controlled by the use of a closed loop system during ordinary condition, and by the use of an open loop system when the engine speed is in a predetermined low rotational speed zone.

The apparatus for controlling the timing of injection of fuel according to the present invention has means for determining a target timing of injection in accordance with the operating conditions of the internal combustion engine, means for detecting the actual timing of injection, means for detecting the difference between the target timing of the injection of fuel and the actual timing of the injection of fuel, and an actuator for operating the injection timing adjusting member of the fuel injection pump. When the internal combustion engine is in a predetermined normal operation mode, for example when it is operated at a speed higher than the predetermined rotational speed, a closed loop control is carried out in such a way that the actuator is driven in accordance with the above difference and the actual timing of injection is made coincident with the target timing of injection. On the other hand, when the internal combustion engine is operated in a mode other than the normal operating mode mentioned above, the timing of injection is controlled by employing an open loop in which the actuator is driven by a driving signal produced from another signal generator.

As for the predetermined operating conditions for switching between the closed loop system and the open loop system herein, any appropriate condition indicating the fact that the rotational speed of the engine has become lower than the predetermined value, can be selected. For example, it is possible to select the condition that the adjusting member for adjusting the amount of fuel injected is located beyond a predetermined position in the direction of decreasing amount of fuel injection, or that the operating amount of an accelerator has become less than a predetermined amount. Whe the control mode is changed upon sensing these conditions which indicate that the engine is operating in the low rotational speed zone, the timing of the injection of fuel is controlled by the use of an open loop system which may provide a constant timing of the injection of fuel, or in case of a hydraulic timer etc., may control the timing in accordance with the rotational speed of the engine, that is, the oil pressure. Therefore, data indicating the actual timing of the injection of fuel is not required and the fuel injection control can be carried out in a stable condition since the unstable factors due to the low engine speed are not fed back. On the other hand, when the engine is operating in other than the low rotational speed zone, highly accurate control on the injection timing can be carried out by the use of the closed loop system.

The invention will be better understood and the other objects and advantages thereof will be more apparent from the ensuing detailed description of a preferred embodiment taken in conjunction with the drawings.

BRIEF DESCRIPTION OF THE DRAWINGS

FIGS. 2A and 2B are waveforms of the first and second pulse train signals, respectively;

FIG. 3 is a flow chart of the control program to be stored in a microcomputer when a circuit block enclosed by the broken line in FIG. 1 employs a microcomputer.

DESCRIPTION OF THE PREFERRED EMBODIMENT

Figure 1:
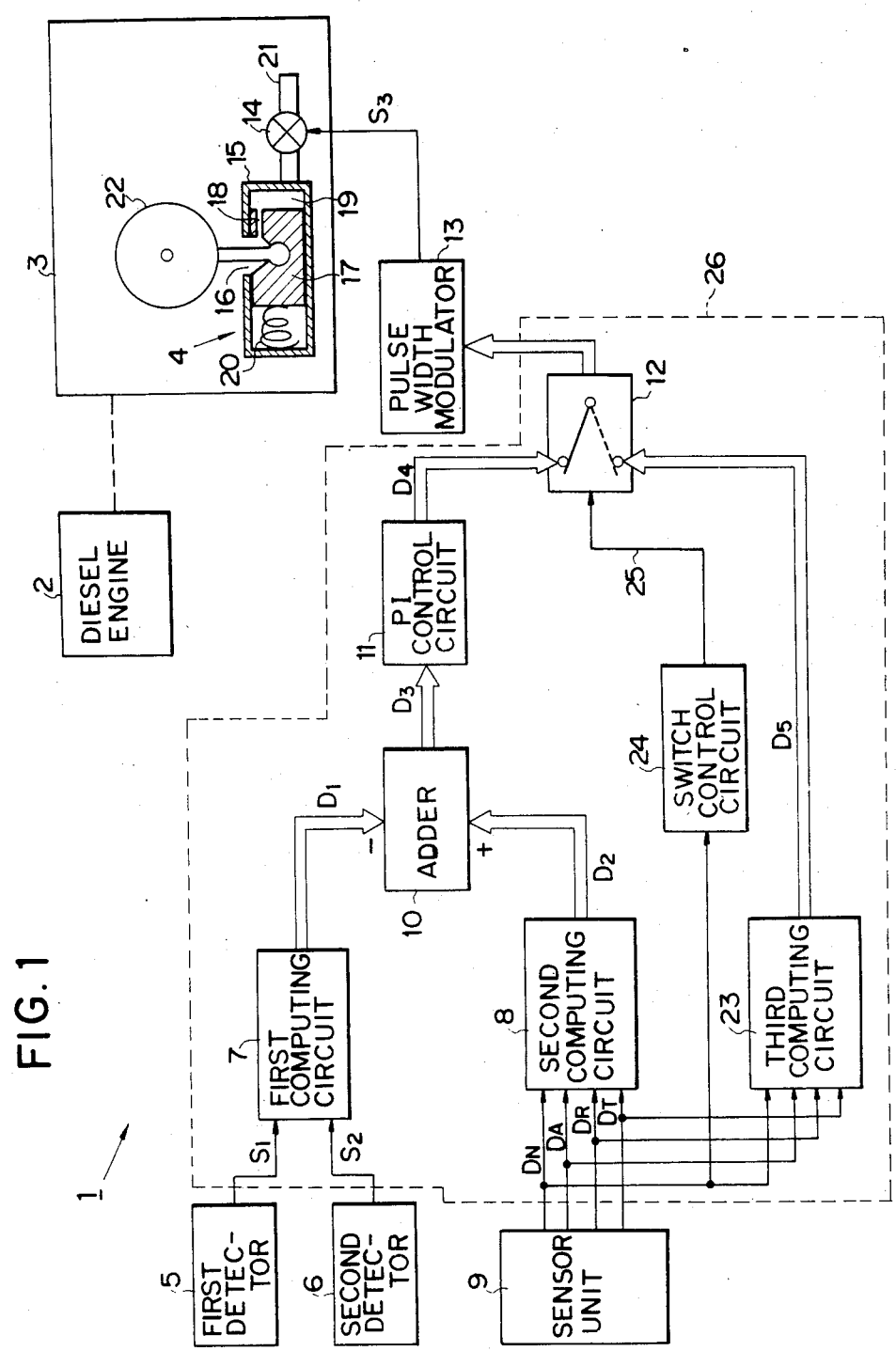
FIG. 1 is a block diagram illustrating an embodiment of the control apparatus for controlling the timing of injection of fuel of the present invention.

FIG. 1 shows a block diagram of an embodiment of an apparatus for controlling the timing of injection of fuel according to the present invention. The control apparatus 1 is an apparatus for controlling the timing of injection of fuel by a fuel injection pump for injecting fuel into an internal combustion engine, and in this embodiment, it is an apparatus for electronically controlling a hydraulic timer 4 provided in a distribution type fuel injection pump 3 so as to control the timing of injection of fuel of the fuel injection pump 3 for distributing and supplying fuel to each cylinder of a four-cycle four-cylinder Diesel engine 2. The control apparatus 1 has a first detector 5 including a needle valve lift sensor (not shown) which is mounted on one of the fuel injection valves (not shown) mounted on a cylinder of the Diesel engine 2, and a second detector 6 including a top dead center (T.D.C.) sensor (not shown) which is adapted to produce a pulse for every ½ rotation of the crankshaft of the engine. The first detector 5 generates a first pulse train signal $S_1$ which consists of pulse signals $P_{11}$, $P_{12}$, $P_{13}$, ... produced one each time the needle valve of the fuel injection valve is lifted, and, the second detector 6 generates a second pulse train signal $S_2$ which consists of pulse signals $P_{21}$, $P_{22}$, $P_{23}$, ..., which are produced one each time any one of the predetermined pistons of the engine reaches its top dead center (See FIG. 2B).

In this embodiment, since the Diesel engine 2 is a four-cylinder, four-cycle engine, one pulse is generated from the first detector 5 every time four pulses are generated from the second detector 6, as shown in FIGS. 2A and 2B. The pulse train signals $S_1$ and $S_2$ are applied to a first computing circuit 7 where the difference in timing between each pulse $P_{11}$, $P_{12}$, ... of the first pulse train signal $S_1$ and each corresponding pulse $P_{21}$, $P_{25}$, ... of the second pulse train signal $S_2$ is computed as the difference in rotational angle of the crankshaft, and the result of this computation is output as first data $D_1$ indicative of the actual timing of the injection of fuel at each instant.

On the other hand, a second computing circuit 8 is provided for computing the optimum timing of injection of fuel in accordance with the operating conditions of the Diesel engine 2 at each instant. Speed data $D_N$ indicative of the rotational speed of the Diesel engine 2, acceleration data $D_A$ indicative of the amount of operation of the accelerator pedal (not shown), sleeve position data $D_R$ indicative of the position of a control sleeve and coolant temperature data $D_T$ indicating the temperature of the engine coolant are applied to a second computing circuit 8 from a sensor unit 9 and the optimum timing of injection of fuel according to the operating condition of the engine at each instant is computed in response to these input data. The computed result is output as second data $D_2$ indicating the target timing of injection of fuel. The second computing circuit 8 can be arranged, for example, in such a way that various data on injection timing are stored in a ROM in advance and, by applying address values determined by each input data, to the ROM as address signals, the data indicating the required target timing of the injection of fuel can be read out from the ROM in accordance with the combination of the input data.

The first and the second data $D_1$ and $D_2$ produced from the first and second computing circuits 7 and 8 are output as binary digital data and these data are added in an adder 10 with the polarities shown in the figure, producing error data $D_3$ indicating the difference between the data $D_1$ and $D_2$. The error data $D_3$ is applied to a PI control circuit 11 to be subjected to data processing required for proportional and integral control and the resulting output is produced as data $D_4$ for closed loop control. The data $D_4$ for closed loop control is applied to a pulse width modulator 13 through a switch 12 and a driving pulse signal $S_3$ whose duty cycle changes in accordance with the data $D_4$ is produced from the pulse width modulator 13. The signal $S_3$ is applied, as an ON/OFF control signal, to a solenoid valve 14 for timing control of the hydraulic timer 4.

The fuel pressurized in the fuel injection pump 3 is supplied to the timer 4 through an opening 16 of a casing 15 of the timer 4, and the pressurized fuel passes into a chamber 19 through an orifice 18 defined in a timer piston 17 in the casing 15. As a result, the timer piston 17 is pressed in the lefthand direction of FIG. 1. The timer piston 17 is biased in the righthand direction of FIG. 1 by an expansion spring 20 so as to be positioned where the force of the expansion spring 20 is coincident with the fuel pressure in the chamber 19. The chamber 19 is connected with a fuel tank (not shown) through a pipe 21 having the solenoid valve 14. Since the average opening area of the solenoid valve 14 changes in accordance with the duty cycle of the driving pulse signal $S_3$, the fuel pressure in the chamber 19 will be determined by the duty cycle of the driving pulse signal $S_3$. Therefore, the timer piston 17 is positioned in accordance with the data $D_4$ for closed loop control. A roller holder 22 which is used for adjusting the timing of the injection in the distribution type fuel injection pump 3, is connected with the timer piston 17, and the rotational position of the roller holder 22 is adjusted in accordance with the position of the timer piston 17. As a result, the control of the timing of injection of fuel by the timer 4 is performed by using the closed loop system in accordance with the result of a comparison of the actual timing of injection with the target timing of injection, and the actual timing of injection is controlled so as to be coincident with the target timing of injection.

For the purpose of changing the control system of the timer 4 from the closed loop system to the open loop system when the rotational speed of the engine becomes less than a predetermined low rotational speed, the control apparatus 1 has a third computing circuit 23 for computing a target timing of injection of fuel for open loop control which is used when the engine speed is less than the predetermined engine speed, and a switch control circuit 24 for discriminating whether or not the engine speed is less than the predetermined engine speed.

As in the case of the second computing circuit 8, the speed data $D_N$, the acceleration data $D_A$, the sleeve position data $D_R$ and the coolant temperature data $D_T$ are applied to the third computing circuit 23 to compute the optimum timing of injection of fuel in response to these input data, and an open loop control data $D_5$ indicative of the required duty cycle of the driving pulse signal $S_3$ for obtaining the optimum timing of injection of fuel, is produced therefrom. The data $D_5$ is applied to the switch 12 and is supplied to the pulse width modulator 13 in place of the data $D_4$ when the switch 12 is changed over as shown by the broken line. As a result, the control apparatus 1 is changed from the closed loop system to the open loop system.

The third computing circuit 23 can be arranged, for example, in such a way that various open loop control data are stored in a ROM in advance and the data stored in the ROM indicating the desired duty cycle is selected and read out from the ROM as the desired open loop control data in accordance with the combination of the input data when address values determined by the respective input data are applied to the ROM as address signals.

The speed data $D_N$ is applied to the switch control circuit 24 and, when the rotational speed of the engine falls below the predetermined value, the level of the output line 25 is changed from "L" to "H" and the switch 12 is changed from the switching state shown by the solid line to that shown by the broken line. As a result, the open loop control data $D_5$ is applied to the pulse width modulator 13 in place of the closed loop control data $D_4$ for closed loop control. Consequently, in the predetermined low rotational speed zone of the engine, the duty cycle of the driving pulse signal $S_3$ is controlled in accordance with the open loop control data $D_5$ and the timer 4 is controlled in accordance with the data $D_5$.

The circuit block 26 enclosed by the broken line can be constituted by a microcomputer. FIG. 3 shows a flow chart of the program to be executed in the microcomputer in this case.

At first, in step 31, it is discriminated whether or not the engine speed N is larger than the predetermined speed $N_0$, and when $N > N_0$, the actual timing of injection $\theta_i$ and the target timing of injection $\theta_s$ are computed in steps 32 and 33, respectively, and the computation for obtaining the error $\alpha$ between the target timing of injection $\theta_s$ and the actual timing of injection $\theta_i$ is carried out in accordance with the formula $\theta_s - \theta_i$ (step 34). The data $D_3$ indicating the error $\alpha$ is subjected to the data processing required for PI control in step 35, whereafter the resulting output is converted into duty cycle data (data $D_4$ for closed loop control) which determined the duty cycle of the driving pulse signal $S_3$ to be applied to the solenoid valve 14. Then, the data $D_4$ is output in step 36 and is applied to the pulse width modulator 13 shown in FIG. 1, whereby the driving pulse signal $S_3$ whose duty cycle changes in response to data $D_4$ is generated from the pulse width modulator 13.

When it is discriminated in step 31 that $N \leq N_0$, the target duty cycle at low speed is computed in step 37 and open loop control data $D_5$ is generated in step 37 to be applied to the pulse width modulator 13.

According to the above arrangement, when the rotational speed of the Diesel engine 2 is higher than the predetermined speed, since the timing of injection is controlled by means of the closed loop system in which the data $D_1$ indicating the actual timing of injection computed on the basis of the timing pulses obtained from the first and second detectors 5 and 6 is fed back, high accuracy control of the timing of injection of fuel can be realized. On the other hand, when the rotational speed of the engine is lower than the predetermined value, the timer 4 is controlled by means of open loop control on the basis of the data $D_5$ computed in the third computing circuit 23. Therefore, even if the amount of injection decreases, the amount of lift of the needle valve of the fuel injection valve decreases, a first pulse train signal $S_1$ of sufficient level cannot be obtained, and the S/N ratio of the signal drops to such extent that accurate computation for the actual timing of injection is difficult, control with high reliability can nevertheless be executed free from any effect on the controlling operation for injection timing. When the rotational speed of the engine falls, the rotational speed in the combustion cycle changes, which makes accurate computation of the actual timing of injection difficult, and the control becomes unstable in case the closed loop controlling operation as described above is employed. However, in the low rotational speed zone, the open loop control is started by the switching of the switch 12, and any adverse effect that might be caused by rotational speed changes in the combustion cycle can be eliminated. That is, when the engine speed is low, since the timing of injection of fuel is controlled by the use of the open loop system, the control system of the timer 4 is not disturbed by any disturbances due to various unstable components occuring in low rotational speed condition and control with higher stability can be secured.

Though the above embodiment refers only to the control of timing of injection in a distribution type fuel injection pump, the present invention is not limited to this embodiment but is applicable to injection timing control of other types of fuel injection pumps as well, such as the in-line type fuel injection pump and the like.

Also, though the above-mentioned embodiment is arranged so as to change over from the closed loop system to the open loop system by switching the switch 12 in response to the fact that the rotational speed of the engine decreases below the predetermined value, it can be arranged to switch in response to other operation parameters such as the amount of operation of the accelerator pedal, positions of the control sleeve and the like. In other words, it can be arranged to control the timing of injection of fuel by the use of the open loop system when the strength of the needle valve lift signal from the fuel injection valve is not sufficient as in the case that the amount of operation of the accelerator pedal becomes less than a predetermined amount, or that the control sleeve has gone beyond a predetermined position in the direction of decreasing the amount of fuel to be injected.

In the embodiment shown in the figure, since the pressure of fuel supplied to the timer 4 changes in accordance with the rotational speed of the engine, the timer 4 tends to be not sufficiently driven in the low rotational speed zone of the engine. Therefore, the apparatus may be arranged in such a way that the timing of injection is controlled in response to the rotational speed of the engine (fuel pressure supplied to the timer 4) by maintaining the solenoid valve 14 in open or closed state, or by applying pulse voltage having a predetermined constant duty cycle to the solenoid valve 14 while the engine is operating in the low rotational speed zone, whereby stability of the operation in the low rotational speed zone is more improved.

Figure 4:
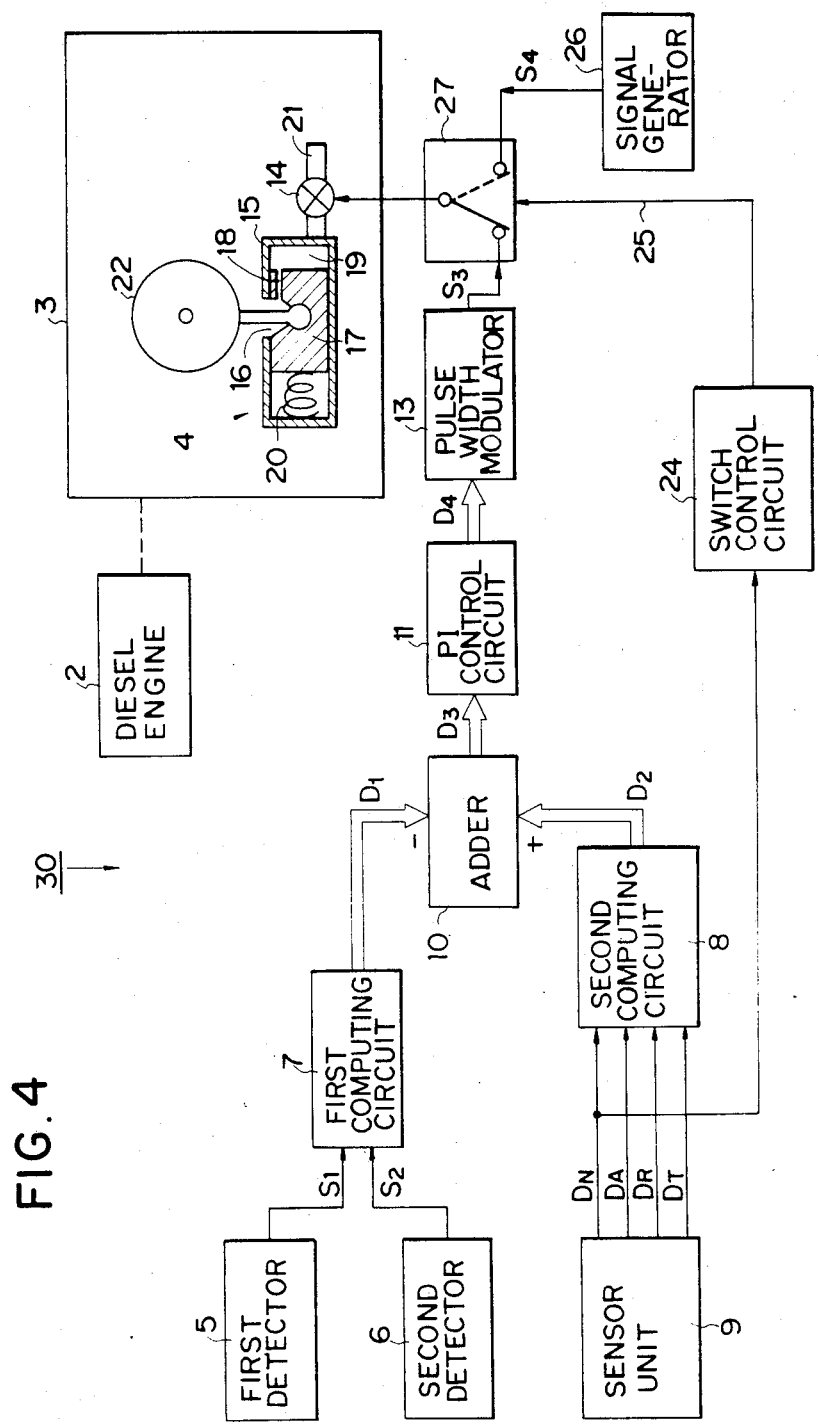
FIG. 4 is a block diagram illustrating another embodiment of the control apparatus for controlling the timing of injection of fuel of the present invention.

FIG. 4 shows another embodiment of a control apparatus 30 of the present invention, by which the purpose described above can be attained. In FIG. 4, the same portions as those shown in FIG. 1 are designated by the same reference numerals. The control apparatus 30 is so arranged that the data $D_4$ is directly applied to the pulse width modulator 13 and the driving pulse signal $S_3$ is applied to the solenoid valve 14 through a switch 27 which is controlled by the switch control circuit 24.

The control apparatus 30 has a signal generator 26 instead of the third computing circuit 23, and a control signal S₄ produced from the signal generator 26 is applied to the switch 27. The swithc 27 is switched over as shown by the solid line to select the driving pulse signal S₃ when the engine speed is equal to or higher than a predetermined speed, and switched over as shown by the broken line to select the control signal S₄ when the engine speed is less than the predetermined speed.

In this embodiment, the control signal S₄ is produced from the signal generator as a signal for maintaining the solenoid valve 14 open.

Therefore, when the engine speed becomes less than the predetermined speed, the closed loop system is switched out and the control is carried out by the fuel pressure in the fuel injection pump 3.

The control signal S₄ may be a signal for maintaining the solenoid valve 14 closed or a pulse signal having a constant duty cycle.

What is claimed is:

1. An apparatus for controlling the timing of injection of fuel supplied to an internal combustion engine from a fuel injection pump having a member for adjusting the timing of injection of fuel, said apparatus comprising:
    means for operating said member;
    a first means for generating a first signal relating to the actual timing of injection of fuel supplied from said fuel injection pump;
    a second means for generating a second signal relating to the target timing of injection of fuel determined by the condition of operation of said internal combustion engine;
    means responsive to said first and second signals for generating an actuating signal for driving said operating means so as to make said actual timing of injection coincident with said target timing of injection by closed loop control;
    a third means for producing a third signal for driving said operating means, said third signal being representative of a normal operating condition of the engine but unrelated to said actual timing of injection;
    means for detecting whether or not said internal combustion engine is being operated in a predetermined low engine speed range; and
    means responsive to the detected result of said detecting means for selectively applying said actuating signal or said third signal to said operating means so as to select said third signal when the engine speed is within said predetermined low engine speed range and said actuating signal when the engine is not within said predetermined low engine speed range.

2. An apparatus for controlling the timing of injection of fuel supplied to an internal combustion engine from a fuel injection pump having a member for adjusting the timing of injection of fuel, said apparatus comprising:
    means for operating said member;
    a first means for generating a first signal relating to the actual timing of injection of fuel supplied from said fuel injection pump;
    a second means for generating a second signal relating to the target timing of injection of fuel determined by the condition of operation of said internal combustion engine;
    means responsive to said first and second signals for generating an actuating signal for driving said operating means so as to make said actual timing of injection coincident with said target timing of injection by closed loop control;
    a third means for producing a third signal for driving said operating means, said third signal being a constant value unrelated to said actual timing of injection;
    means for detecting whether or not said internal combustion engine is being operated in a predetermined low engine speed range; and
    means responsive to the detected result of said detecting means for selectively applying said actuating signal or said third signal to said operating means so as to select said third signal when the engine speed is within said predetermined low engine speed range and said actuating signal when the engine is not within said predetermined low engine speed range.

3. An apparatus as claimed in claim 1 wherein said third means produces said third signal in response to at least one operating parameter showing the condition of operation of said internal combustion engine to control the timing of injection by an open loop system.

4. An apparatus as claimed in claim 1 wherein said second means has a sensor unit for producing at least one signal indicating the condition of operation of said internal combustion engine, and a computing circuit which computes said target timing of injection in response to at least one signal from a sensor unit and produces said first signal.

5. An apparatus as claimed in claim 1 wherein said first means has a first detector for detecting the timing at which the pistons of said internal combustion engine reach a predetermined reference position, a second detector for detecting the timing of the beginning of injection of fuel from said fuel injection pump into a cylinder of said internal combustion engine and a computing circuit which computes the injection advance in response to the detected result of first and second detectors and produces a signal indicative of the computed result as said first signal.

6. An apparatus as claimed in claim 1 wherein said operating means is a hydraulic timer responsive to the fuel pressure supplied from said fuel injection pump having a timer piston which is connected with said member and a solenoid valve for regulating the fuel pressure applied to the timer piston.

7. An apparatus as claimed in claim 6 wherein said actuating signal generating means has a circuit responsive to said first and second signals for generating an error signal showing the difference between said actual timing of injection and said target timing of injection and a pulse width modulator responsive to the error signal for producing as said actuating signal a pulse signal whose duty cycle changes in accordance with the error signal, whereby to control the average opening area of the solenoid valve in accordance with the error signal.

8. An apparatus as claimed in claim 6 wherein said third signal is a signal for maintaining said solenoid valve to open.

9. An apparatus as claimed in claim 6 wherein said third signal is a signal for maintaining said solenoid valve to closed.

10. An apparatus as claimed in claim 1 wherein said detecting means operates in response to a signal indicative of the speed of said internal combustion engine.

11. An apparatus as claimed in claim 3 wherein said third means has a memory in which various open loop control data are stored in advance and a selected open loop control data is read out from said memory by the application of at least one signal indicating an engine operating parameter to generate said third signal.

12. An apparatus according to claim 1, wherein said third signal is representative of the engine coolant temperature.

* * * * *